J. P. WRIGHT.
MATCH MACHINE.
APPLICATION FILED DEC. 19, 1904.

901,410.

Patented Oct. 20, 1908.

7 SHEETS—SHEET 1.

WITNESSES:
INVENTOR
Jacob P. Wright,
BY
ATTORNEY

J. P. WRIGHT.
MATCH MACHINE.
APPLICATION FILED DEC. 19, 1904.

901,410.

Patented Oct. 20, 1908.

7 SHEETS—SHEET 2.

WITNESSES:
John H. Tenney
M. G. Hayes

INVENTOR
Jacob P. Wright,
BY
John R. Nolan
ATTORNEY

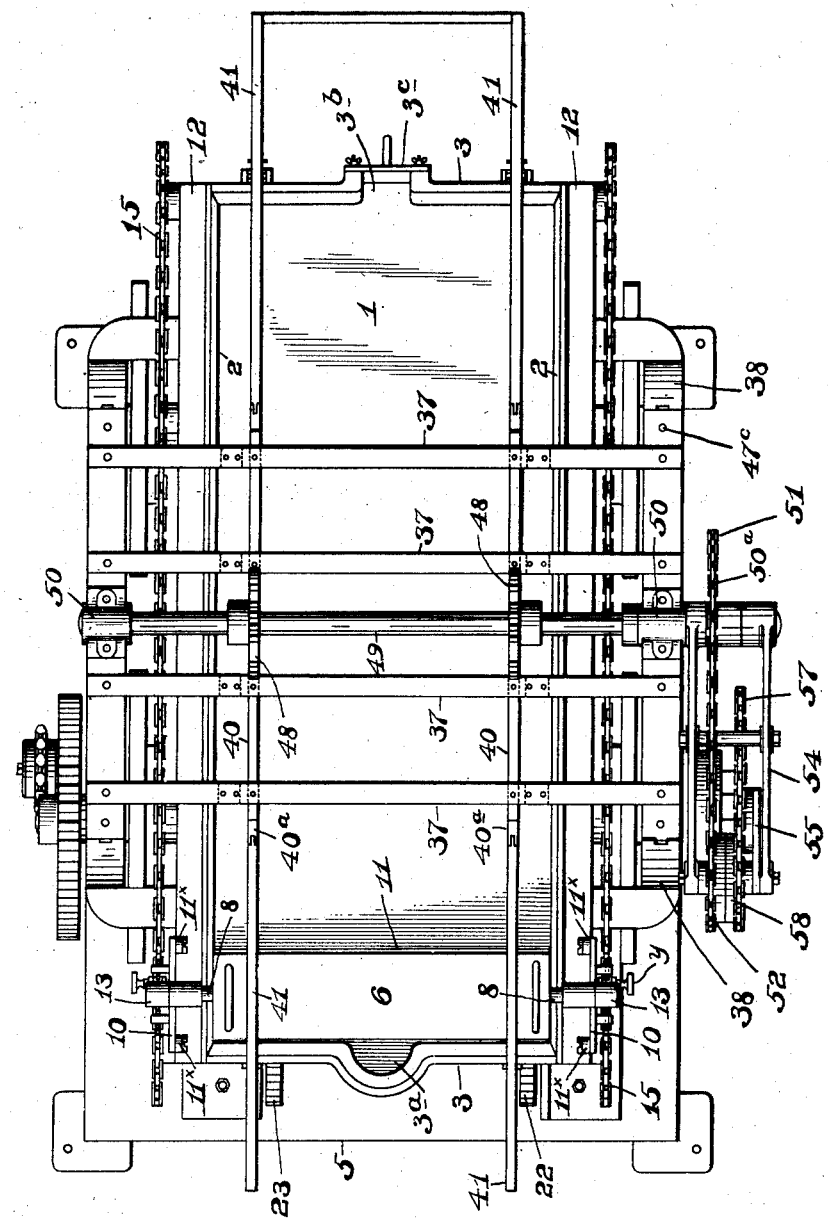

J. P. WRIGHT.
MATCH MACHINE.
APPLICATION FILED DEC. 19, 1904.
901,410.
Patented Oct. 20, 1908.
7 SHEETS—SHEET 4.
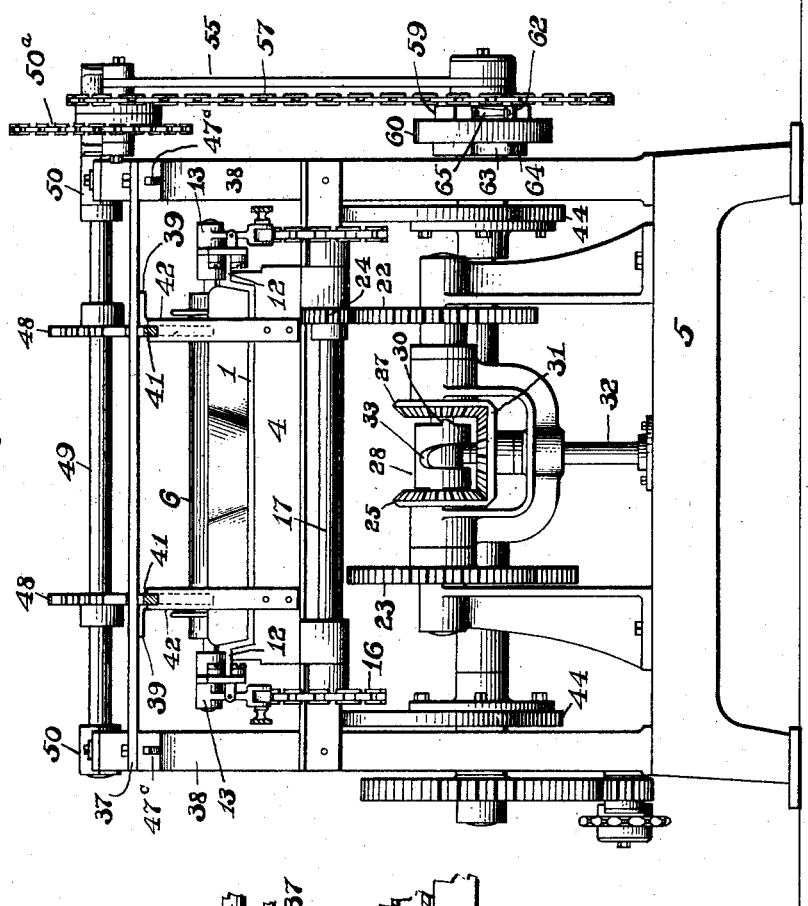
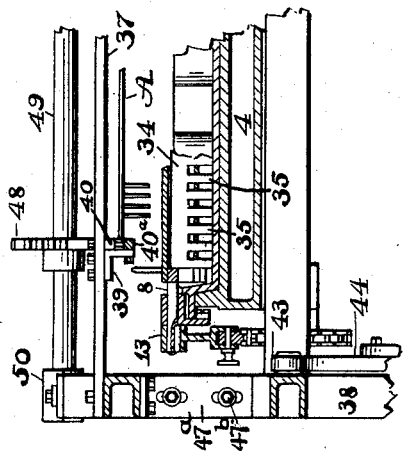
WITNESSES:
INVENTOR
Jacob P. Wright,
BY
ATTORNEY

J. P. WRIGHT.
MATCH MACHINE.
APPLICATION FILED DEC. 19, 1904.

901,410.

Patented Oct. 20, 1908.

7 SHEETS—SHEET 5.

WITNESSES:
John H. Tenney
M. G. Hayes

INVENTOR
Jacob P. Wright,
BY
John K. Nolan
ATTORNEY

J. P. WRIGHT.
MATCH MACHINE.
APPLICATION FILED DEC. 19, 1904.

901,410.

Patented Oct. 20, 1908.

7 SHEETS—SHEET 6.

WITNESSES:
John H. Tenney

INVENTOR
Jacob P. Wright,
BY
ATTORNEY

J. P. WRIGHT.
MATCH MACHINE.
APPLICATION FILED DEC. 19, 1904.
901,410.
Patented Oct. 20, 1908.
7 SHEETS—SHEET 7.
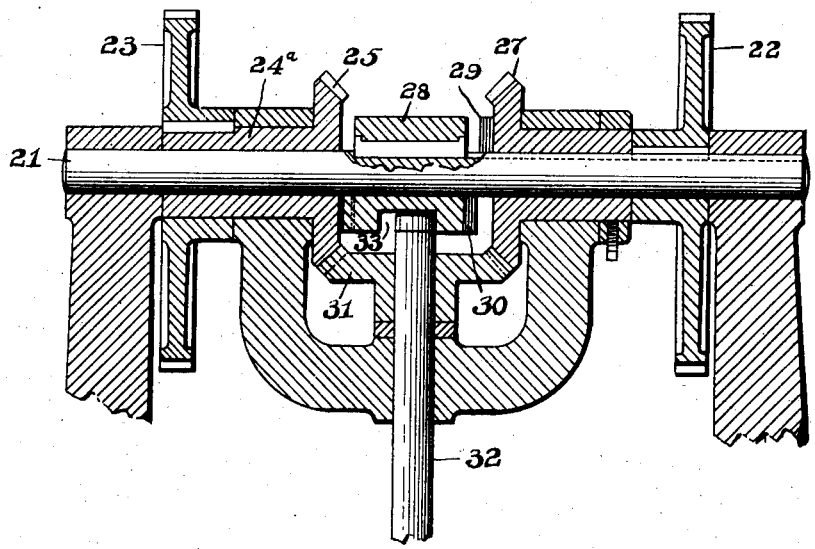
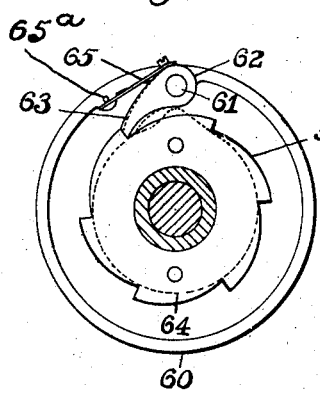
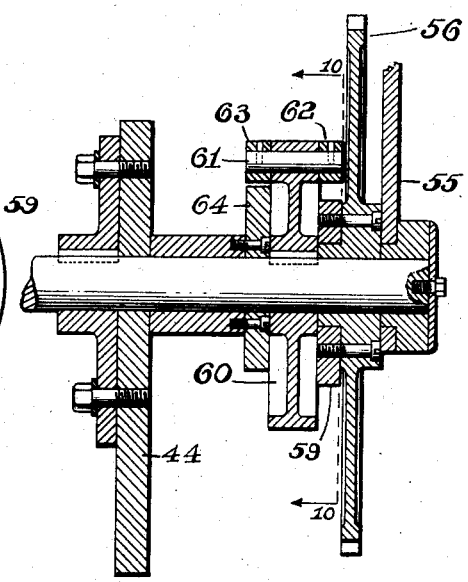
WITNESSES:
INVENTOR
Jacob P. Wright,
BY
John A. Nolan
ATTORNEY
THE NORRIS PETERS CO., WASHINGTON, D. C.

UNITED STATES PATENT OFFICE.

JACOB P. WRIGHT, OF BARBERTON, OHIO, ASSIGNOR TO THE DIAMOND MATCH COMPANY, OF NEW YORK, N. Y., A CORPORATION OF ILLINOIS.

MATCH-MACHINE.

No. 901,410.     Specification of Letters Patent.     Patented Oct. 20, 1908.

Application filed December 19, 1904. Serial No. 237,528.

*To all whom it may concern:*

Be it known that I, JACOB P. WRIGHT, a citizen of the United States, and resident of Barberton, in the county of Summit and State of Ohio, have invented certain new and useful Improvements in Match-Machines, of which the following is a specification.

This invention relates to improvements in match making machines having reference more especially to that class of machines in which an endless, flexible carrier is employed to receive the splints and transport them progressively through a suitable path for treatment with composition and for final conversion into complete matches.

The present improvements concern novel and efficient mean for applying the ignitible composition to the ends of the splints, and to that end comprise various novel constructions and organizations of mechanisms which will be hereinafter fully described and claimed.

Figure 1:
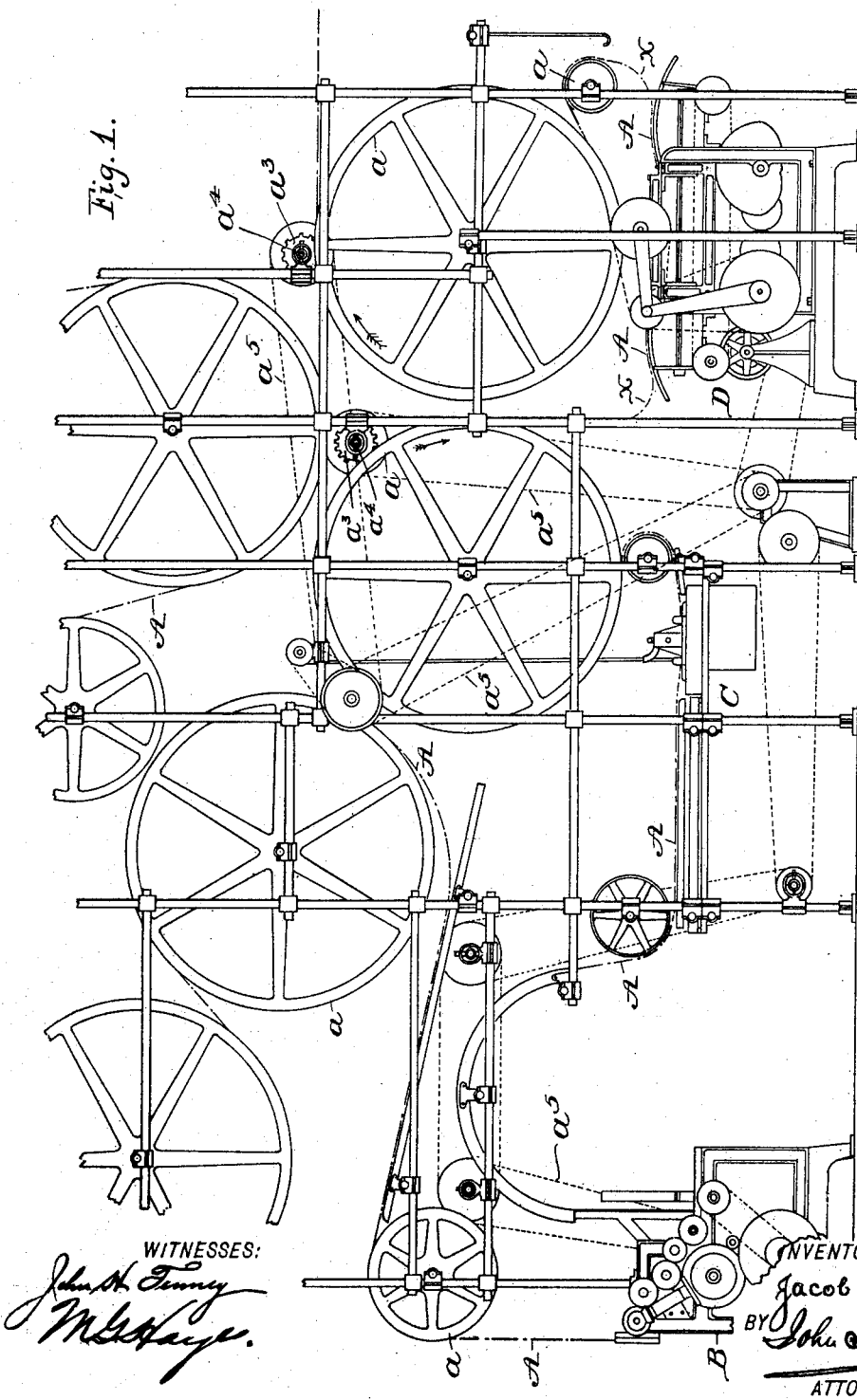
Figure 2:
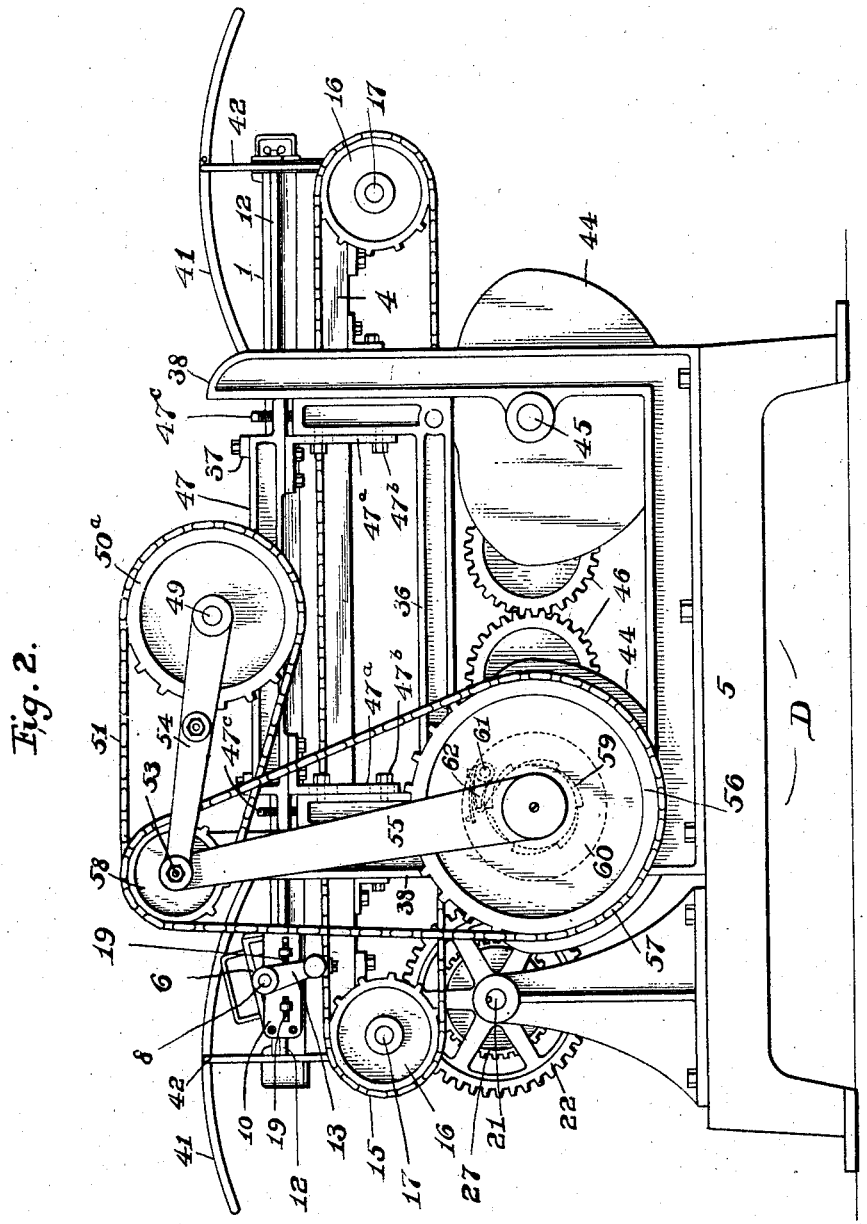
Figure 6:
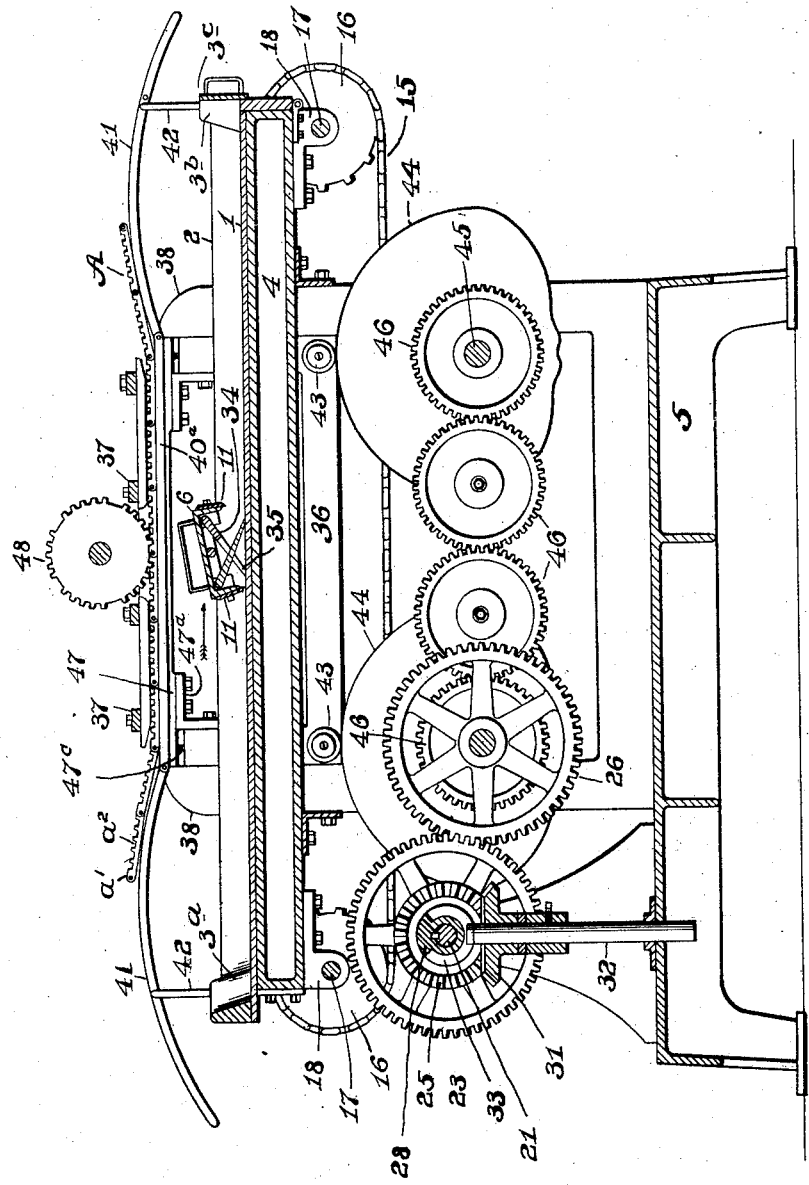
Figure 7:
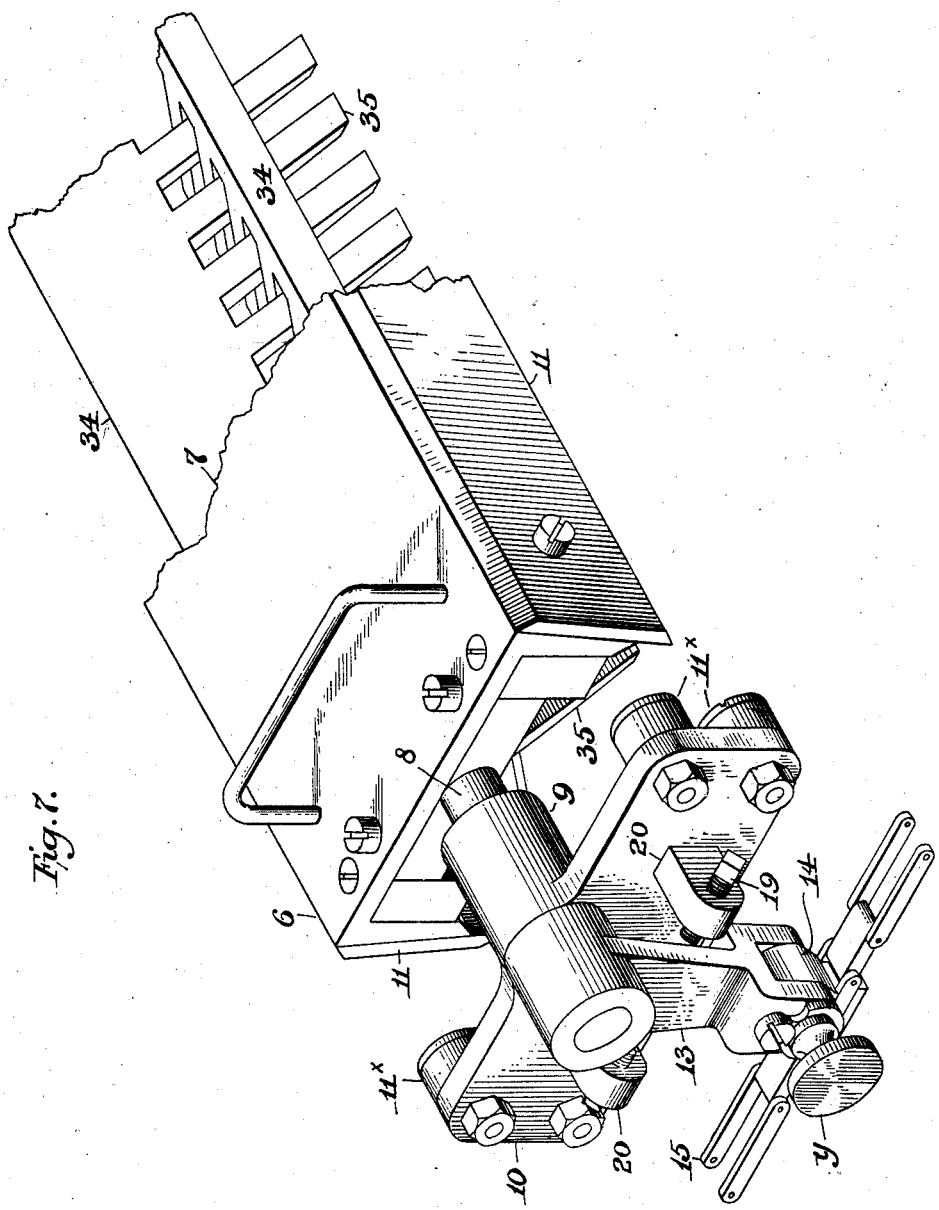

In the annexed drawings—Figure 1 is a diagram of a match making machine equipped with composition-applying apparatus embodying my invention. Fig. 2 is a side elevation of the said apparatus; the dipping frame thereof, and adjuncts, being in the down or dipping position. Fig. 3 is a plan of Fig. 2. Fig. 4 is an end elevation of the same. Fig. 5 is a partial vertical section through the dipping frame and the composition bed, showing the carrier as supplied with splints. Fig. 6 is a longitudinal vertical section of the apparatus, showing the dipping frame in its raised position, a section of carrier thereon, and the mixer and scraper head traversing the composition bed of the apparatus. Fig. 7 is a perspective view of a portion of the mixer and scraper head, showing its connection with one of the impelling chains. Fig. 8 is a vertical section through the driving and reversing mechanism for the said chains. Fig. 9 is a section of the pawl and ratchet mechanism, and adjuncts, for actuating the driving mechanism for the portion of the carrier over the composition bed. Fig. 10 is a section, as on the line 10—10 of Fig. 9.

Referring to the diagram, (Fig. 1), A indicates the endless carrier supported and guided by suitably arranged wheels $a$; B is the station where the splints are inserted into the carrier, and where the completed matches are discharged from the carrier after it has made practically a complete cycle of movement; C is the mechanism for treating the lower ends of the splints with paraffin, sulfur, or the like, and D is the apparatus for thereafter applying the "heading" composition to the extremities of the splints.

The carrier is preferably of the type wherein perforated plates, $a'$, provided with rack teeth $a^2$, are linked or jointed together in endless series; suitably driven gear wheels $a^3$ meshing with the rack teeth to actuate the carrier.

The gear wheels $a^3$ are disposed at various points throughout the course of the carrier; and they are so located as to impel the carrier before it reaches the apparatus D, and after it passes the same. The wheels are carried by suitably located shafts $a^4$ which are connected by sprocket gearing $a^5$ and driven concertedly from a suitable source of power.

The portion of the carrier passing over the apparatus D is at that time practically independent of the main body of the carrier. Hence a special supplementary driving mechanism is provided therefor, and by reason of its independent operation slackness of the carrier must be provided at the front and rear ends of the apparatus, as indicated at $x$. This supplementary driving mechanism will be hereinafter described in detail.

During the passage of the endless carrier over the composition-applying apparatus, the carrier is alternately depressed and raised in respect to a horizontal bed 1 upon which uniform layers of composition are successively spread, thereby dipping the lower ends of the splints into the composition, and providing ignitible "heads" for the matches. The bed is provided with upwardly projecting side and end walls 2, 3, respectively, and it constitutes, in effect, a shallow pan. The end walls are preferably formed with recesses or offsets, $3^a$, $3^b$, respectively, the former of which affords a chamber to receive the composition and the other one ($3^b$) of which is provided with a removable gate, $3^c$, by way of which the composition may be discharged. This pan is imposed upon, or it may form a part of, a chambered structure 4, through which steam or other heating fluid is caused to flow in order to maintain the composition at the proper consistency, and the whole is supported upon a suitable framework 5. Mounted to reciprocate within, and from end to end of, the pan, is a scraper head 6, by means of which the composition is agitated and distributed upon the bed in a layer of uniform thickness. This head, in its preferred construction, includes a bar member 7, extending from side to side of the pan, and provided at its end with trunnions 8 which project through and beyond bearings 9 in traveling blocks 10, whereby, as will hereinafter appear, the said head may be oscillated, as well as reciprocated longitudinally of the bed. On the respective sides of the member 7 are depending scraper blades 11, either of which may be moved adjacent to the bed, by partially turning the member 7 on its axis, thereby during the traverse of said member spreading the composition in a layer of uniform thickness throughout the length and width of the bed.

The blocks 10 are provided on their inner sides with anti-friction rollers $11^x$ which embrace longitudinal rails 12 on the exterior walls of the steam chamber, which rails support and guide the blocks during their traverse. On the projecting ends of the trunnions are fixed depending arms 13 which are pivotally connected at their lower ends to lugs or projections 14 on endless chains 15 which are disposed on the respective sides of the apparatus. The pivot pins are preferably provided with knobs $y$, whereby they may be readily applied or removed as occasion may require, thereby rendering the scraper head detachable at will. The chains 15 pass around sprocket wheels 16 carried by shafts 17 which are journaled in brackets 18 depending from the steam chamber. Means are provided whereby these chains are driven back and forth in order to impel the arms 13 and their connections from end to end of the apparatus. These arms depend between set screws 19 fitted to lugs 20 on the outer sides of the respective blocks, which screws serve as adjustable abutments for the arms to determine the angularity of the latter and perforce the degree of inclination of the scraper head. That is to say, there is a predetermined amount of lost motion for the arms between the screws, and hence, upon the initial reversal of movement of the chains, the arms are swung onward for a limited distance in a manner to rock the scraper head on its axis and thus reverse its inclination. By adjusting the screws of each block toward or from each other, the inclination of the scraper may be varied to increase or diminish the depth of the layer of composition as requirements may demand.

When the scraper head has been impelled to the limit of its stroke, by the chains, there is an interval of rest before the succeeding stroke occurs, the purpose of the dwell being to permit the movement of the carrier with its splints toward and from the composition bed, as will be hereinafter explained. While any appropriate means may be employed for actuating the chains, I prefer to use mechanism of the following description, reference being had to Figs. 2, 4 and 8 :—Mounted in suitable bearings in the frame 5, is a transverse shaft 21 carrying near its respective ends two gear wheels 22, 23. The wheel 22 is keyed to the shaft and is in mesh with a pinion 24 on one of the shafts 17. The wheel 23 is keyed to the sleeve $24^a$ (Fig. 8) of a bevel wheel 25 which is loosely mounted on the shaft 21. This wheel 23 is in mesh with a gear wheel 26 on the main driving shaft, and is thereby continuously revolved. Loose on the shaft 21 is a wheel 27 similar to the bevel wheel 25, but oppositely disposed thereto, and between these two bevel wheels is mounted a clutch member 28. This member is keyed to the shaft 21 so as to rotate therewith, yet be capable of longitudinal movement thereon toward and from the respective bevel wheels 25, 27. The inner faces of the latter are provided with stops 29, and the opposing ends of the clutch member are provided with teeth 30 to co-act therewith. In mesh with the wheels 25, 27, is a common bevel wheel 31 which is loosely mounted on a fixed vertical shaft 32, the upper end whereof constitutes a stud which engages a peripheral cam groove 33 in the clutch member. The contour of the cam is such that during the rotation of the clutch member its engagement with the stud effects its movement at stated intervals from one bevel wheel to the other. It will be seen that by reason of the interposed bevel wheel 31, the two wheels 25, 27, rotate freely in opposite directions to each other, and that in the absence of the clutch no motion would be communicated to the shaft 21. Now, assuming the clutch to occupy the position illustrated in Fig. 8, that is, in engagement with the wheel 25, and assuming this wheel to be continuously driven through its gearing with the main shaft, it will be seen that the shaft 21 is correspondingly driven, and that the motion is transmitted therefrom through the gears 22, 24 to the carrier chains in a manner to impel the scraper head toward one end of the bed. When such head reaches the end of its stroke, the cam effects the shifting of the clutch from the bevel wheel 25 and into the path of the stop on the wheel 27, whereupon, when this stop encounters the opposing tooth of the clutch, the latter and the shaft 21 are turned thereby reversely to the preceding movement. Consequently the direction of travel of the chains is reversed.

At the end of this reverse stroke of the chains, their movement is again changed, and so on in alternation. By reason of the contour of the clutch cam, there is a suitable dwell before the lug of the bevel gear co-acts with the clutch. It will be understood, of course, that the clutch does not make a complete revolution, as, owing to the relative proportions of the co-acting gear wheels, an oscillatory movement of the shaft 21 is sufficient to effect the requisite travel of the scraper head.

In order thoroughly to mix and distribute the composition upon the bed during the traverse of the scraper head, I journal within the head a pair of oppositely inclined bars 34, provided with inter-locking teeth 35 which rest upon the bed. These bars constitute, in effect, combs. They are pivoted at their upper ends to lugs or bearings at the extremities of the scraper head, so as to gravitate upon the bed, and thus lie in close contact therewith, irrespective of the direction of travel of the head. (See Figs. 5 and 6).

It will be seen that preparatory to each stroke of the mixer and scraper head, it is tilted on its axis in a manner to throw up the leading blade to permit the action of the comb bars upon the composition, and to throw down the rearward blade to insure the disposition of a uniform layer of composition upon the bed. It will also be seen that the inside of the head forms a pocket in which is carried a supply of composition to be distributed over the bed 1.

As hereinbefore indicated, when the head is at the end of its stroke a portion of the carrier is depressed to dip the lower extremities of the splints into a layer of composition, and is then elevated therefrom. Thereupon the carrier is moved onward, a fresh layer of composition is provided, and the operation is repeated.

The portion of the carrier passing over the composition bed is supported and guided by a vertically movable dipping frame comprising rectangular side members 36 connected by rigid cross bars 37, the side members being guided between uprights 38 of the main frame. Fixed to the cross bars by means of depending brackets 39 are longitudinal guides which support and guide the respective ends of the carrier plates directly above the composition bed. The guides each comprise spaced upper and lower rail bars 40, 40$^a$ respectively, between which the carrier passes; the upper bars being preferably sectional and disposed to afford a space for the passage of the carrier actuating gear wheel 48 hereinafter described. Pivoted to the ends of the bars 40$^a$ are curved extension bars 41 the outer portions of which rest upon the bifurcated upper ends of posts 42 rising from the respective ends of the bed. These extensions also support the carrier and by reason of their flexibility permit the easy raising and lowering of the carrier.

The side members of the dipping frame are provided with suitably-located anti-friction rollers 43 which rest upon the peripheries of cams 44, one of which cams is carried by the main driving shaft and the other by a transverse shaft 45. The two shafts are connected by a train of gears 46, and hence the cams are concertedly revolved. These cams are properly shaped to effect the periodical rising and falling of the dipping frame. The frame is lowered and raised when the scraper head is at the end of its stroke. Then the section of the carrier on the frame is moved onward, and the next succeeding portion of the carrier is lowered and raised, and so on the dipping operation is progressively effected throughout the entire length of the endless carrier.

To provide for the ready adjustment of the rail bars 40, 40$^a$, and their appurtenances, toward and from the composition bed, as the length of the splints in the carrier, or the size of the "head" to be formed on the splints may require, I make the top bars 47 of the side frame members vertically adjustable thereon. To this end, the bars 47 are connected to the proximate end pieces of the side members by means of angle pieces 47$^a$, the latter being connected to such end pieces by screws 47$^b$, the holes for which in the angle pieces are elongated vertically. Set screws 47$^c$ extend from the ends of the bars into the tops of the end pieces of the side members. Hence by loosening the screws 47$^b$ and properly manipulating the set screws 47$^c$, the bars 47, with their appurtenances, may be minutely adjusted vertically.

The supplementary driving means hereinbefore alluded to for impelling the section of the carrier when the dipping frame is raised, includes a pair of gear wheels 48 (Figs. 3, 4 and 5), which mesh with the teeth of the carrier. These wheels are borne by a shaft 49 which has its bearings in boxes 50 on the dipping frame so as to be raised and lowered by the latter. One end of the shaft 49 extends outwardly beyond the frame and carries a sprocket wheel 50$^a$ which is connected by means of a chain 51 with a smaller sprocket wheel 52 whose shaft 53 is supported at the free end of an oscillatory frame 54. This frame is loosely mounted at one end on the shaft 49, its opposite end being in turn supported by an arm 55 loosely mounted on the end of the main shaft. On the latter shaft is a sproket wheel 56 which is connected by means of a chain 57 with a sprocket wheel 58 on the shaft 53. By this construction it will be seen that when the wheel 56 is driven, the motion will be transmitted therefrom to the shaft 49 in a manner to impel the carrier, and that by reason of the jointed supports for the shaft 53 the cooperative relation of the parts will not be disturbed by the vertical movement of the dipping frame. In order to provide for the operation of this wheel at the proper time, that is, when the dipped section has been raised, the wheel 56 is loosely mounted on its shaft, and a ratchet wheel 59 is secured to, or formed on, one face of the wheel. Keyed to the shaft, adjacent this ratchet wheel, is a disk 60 through which extends a pivot pin 61 carrying at its respective ends two arms 62, 63, one of which constitutes a pawl to co-act with the teeth of the ratchet wheel, and the other constitutes a lever arm which rides upon a cam 64 affixed to the framework of the apparatus. A flat spring 65 is secured at one end to the pawl and the free flexible end of this spring is depressed upon the pawl by a laterally projecting pin 65$^a$ (Fig. 10) in the disk, so as thereby to hold the pawl normally in engagement with the teeth of the ratchet wheel. The relation of the parts just described is such that when the splints have been dipped into the composition and raised therefrom, the pawl is in engagement with the ratchet wheel, and hence the latter, during the revolution of the pawl, is actuated to effect the operation of the carrier actuating wheels 48, and thus advance the portion of the carrier bearing the "headed" splints. Thereupon the cam 64 raises the arm 63 and disengages the pawl from the ratchet wheel, the cam retaining the arm in the raised position until the succeeding section of dipped splints has been lifted from the composition; and so on at predetermined intervals the pawl is moved into and out of action to impel the succeeding sections of the carrier. (See Figs. 2, 3, 4, 9 and 10.)

I claim—

1. In a match making machine employing an endless flexible splint carrier, the combination with said carrier, of a composition applying apparatus in the path thereof, including a composition bed, means for effecting a relative movement between said bed and the portion of the carrier over the same, whereby splints in such portion are treated with composition, and intermittently actuating means associated with said composition applying apparatus for thereafter impelling such portion of the carrier.

2. In a match making machine employing an endless flexible splint carrier, the combination with said carrier, of a composition applying apparatus in the path thereof, including a composition bed, means for raising and lowering the portion of the carrier passing over the same, driving mechanism for engaging said carrier at points in advance and in rear of said apparatus, and supplemental driving mechanism associated with said composition applying apparatus for engaging said carrier at the portion thereof traversing said apparatus, the said carrier having slack portions at the respective ends of the apparatus.

3. In a match making machine employing an endless flexible splint carrier, the combination with said carrier, of a composition applying apparatus in the path thereof including a composition bed, means for moving a portion of the carrier towards and from said bed, yielding supports associated with said carrier-moving means and projecting from the latter to bear the portion of the carrier passing over said apparatus, together with means for actuating the carrier.

4. In a match making machine employing an endless flexible splint carrier, the combination with said carrier, of a composition applying apparatus in the path thereof, including a composition bed, means for supporting a portion of the carrier and moving the same toward and from said bed, whereby the splints are tipped with the composition of the bed, and means carried by said supporting means for impelling such portion of the carrier, said means having a movement with the carrier toward and from the bed.

5. In a match making machine employing an endless, flexible splint carrier, the combination with said carrier of a composition applying apparatus in the path thereof, including a composition bed, rails having jointed extensions upon which a portion of the carrier is supported above said bed, means for moving said rails toward and from the bed, and means for impelling the carrier.

6. The combination of a composition bed, a tiltable scraper head reciprocable along the same and having scraping means at opposite sides, flexible connections for said head, means for reciprocating said connections, and means for tilting said head on its axis at the respective ends of the bed to bring into alternate operation the opposite scraping means.

7. The combination of a composition bed, a tiltable scraper head therefor having scraping means at opposite sides, traveling devices in which said head is pivotally mounted, means for moving said devices from end to end of the bed, and means for tilting said head on its axis at the respective ends of the bed to bring into alternate operation the opposite scraping means.

8. The combination of a composition bed, a scraper head therefor, oppositely inclined scraper combs pivoted in said head, traveling devices in which said head is axially mounted, means for moving said devices from end to end of the bed, and means for tilting said head on its axis at the respective ends of the bed.

9. The combination of a composition bed, a scraper head therefor, traveling devices in which said head is pivotally mounted, rock arms depending from the head, flexible connections for the arms, means for limiting the movement of the arms, and means for reciprocating said connections.

10. The combination of a composition bed, a scraper head therefor, blocks to which said head is pivoted, parallel guides for said blocks, arms depending from the pivots of the head, adjustable stops on said blocks to limit the axial movement of said arms, and means connected with said arms for reciprocating the blocks from end to end of the bed.

11. The combination of a horizontal bed, a vertically movable frame, means for periodically operating the same, means on said frame for supporting and guiding the carrier, and moving bodily a portion of the latter towards and from said bed, a shaft extending across and having its bearings in said frame, carrier actuating gear wheels on said shaft, a drive shaft, and flexible driving connections between the same and the first named shaft.

12. The combination of a horizontal composition bed, a vertically movable frame, means for periodically operating the same, means on said frame for supporting and guiding the carrier, a shaft having its bearings in said frame, carrier actuating gear wheels on said shaft, a drive shaft, a sprocket wheel loose thereon, pawl and ratchet devices to actuate said wheel, means to render said devices idle at predetermined intervals, and connections between said wheel and the shaft first named.

13. The combination of a horizontal composition bed, a carrier support above the same, means for effecting relative vertical movement between said support and bed, carrier actuating mechanism, a drive shaft, a wheel loose thereon, pawl and ratchet devices to actuate said wheel, means to render said devices idle at predetermined intervals, and connections between the said wheel and the carrier actuating mechanism.

14. The combination of a composition bed, a tiltable scraper head therefor having scraping means at opposite sides, traveling devices in which said head is pivotally mounted, means for moving said devices from end to end of the bed, and means for tilting said head on its axis at the respective ends of the bed to bring into alternate operation the opposite scraping means, of a vertically movable frame, means for periodically operating the same, and means on said frame for supporting and guiding the carrier.

15. The combination of a composition bed, a vertically movable frame comprising sections, one of which is vertically adjustable upon the other, means on the adjustable section for supporting and guiding the carrier, means for reciprocating said frame toward and from the composition bed, a scraper head associated with the composition bed, means for reciprocating said scraper head in relation to said bed, and means for causing a dwell of said scraper head at the limit of its movement in each direction to permit the splints being introduced in the composition between each movement of the scraper head.

16. The combination of a composition bed, a vertically movable frame comprising sections, one of which is vertically adjustable upon the other, means on the adjustable section for supporting and guiding the carrier, means for reciprocating said frame toward and from the composition bed, a shaft having its bearings in said adjustable section, carrier actuating gear wheels on said shaft, a drive shaft, flexible driving connections between same and the first named shaft, a scraper head associated with the composition bed, means for reciprocating said scraper head in relation to said bed, and means for causing a dwell of said scraper head at the limit of its movement in each direction to permit the splints being introduced in the composition between each movement of the scraper head.

17. The combination of a composition bed, a tiltable scraper head reciprocable along the same and having scraping means at opposite sides, connections for operating said head, means for reciprocating said connections, and means for tilting said head on its axis at the limit of its movement in each direction to bring into alternate operation the opposite scraping means.

18. The combination of a composition bed, a tiltable scraper head reciprocable along the same and having scraping means at opposite sides, connections for operating said head, means for reciprocating said connections, means for tilting said head on its axis at the limit of its movement in each direction to bring into alternate operation the opposite scraping means, and means for causing periodical dwells of said head between its reciprocations.

19. The combination of a composition bed, a tiltable scraper head reciprocable along the same and having scraping means at opposite sides, said head also having means for mixing and distributing the composition in said bed, connections for operating said head, means for reciprocating said connections, and means for tilting said head on its axis at the limit of its movement in each direction to bring into alternate operation the opposite scraping means.

20. The combination of a composition bed, a tiltable scraper head reciprocable along the same, said head having scraping means and means for mixing and distributing the composition upon the bed, connections for operating said head, and means for reciprocating said connections.

Signed at Barberton, in the county of Summit and State of Ohio this 9 day of December 1904.

JACOB P. WRIGHT.

Witnesses:
B. C. Ross,
F. M. Root.